(12) United States Patent
Kwak et al.

(10) Patent No.: US 7,561,550 B2
(45) Date of Patent: Jul. 14, 2009

(54) METHOD AND APPARATUS FOR SCHEDULING USER EQUIPMENT IN A SOFT HANDOVER REGION FOR UPLINK PACKET TRANSMISSION

(75) Inventors: Yong-Jun Kwak, Yongin-si (KR); Youn-Hyoung Heo, Suwon-Si (KR); Ju-Ho Lee, Suwon-si (KR); Hwan-Joon Kwon, Suwon-si (KR); Jin-Kyu Han, Suwon-si (KR); Joon-Young Cho, Suwon-si (KR); Young-Bum Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 352 days.

(21) Appl. No.: 11/189,008

(22) Filed: Jul. 26, 2005

(65) Prior Publication Data
US 2006/0018282 A1    Jan. 26, 2006

(30) Foreign Application Priority Data
Jul. 26, 2004 (KR) .................... 10-2004-0058165
Aug. 10, 2004 (KR) .................... 10-2004-0062973

(51) Int. Cl.
H04Q 7/00 (2006.01)

(52) U.S. Cl. .................. 370/331; 370/310; 370/428; 370/516

(58) Field of Classification Search ................ 370/331, 370/230, 310, 428, 516
See application file for complete search history.

(56) References Cited

U.S. PATENT DOCUMENTS

2004/0223507 A1* 11/2004 Kuchibhotla et al. ........ 370/428

(Continued)

FOREIGN PATENT DOCUMENTS

EP    1 213 894 A1    6/2002

(Continued)

OTHER PUBLICATIONS

"Selection of Primary Scheduling Node B in SHO," R1-040492 *3GPP TSG RAN WG1 #37*, Montreal, Canada, May 10-14, 2004.

(Continued)

*Primary Examiner*—Charles N Appiah
*Assistant Examiner*—Michael T Vu
(74) *Attorney, Agent, or Firm*—Roylance, Abrams, Berdo & Goodman, L.L.P.

(57) ABSTRACT

A scheduling method and apparatus are provided for soft handover in a user equipment (UE) in in a mobile communication system supporting an enhanced uplink packet data service. A receiver receives dedicated scheduling assignment information for dedicated scheduling assignment from a serving Node B, and receives at least one scheduling grant indicator for common scheduling assignment from at least one non-serving Node B. A first scheduling decider determines a combined scheduling grant indicator by combining at least one scheduling grant indicator received from the at least one non-serving Node B. A second scheduling decider determines whether to use the combined scheduling grant indicator according to a predetermined reference, and a maximum rate of an uplink according to the dedicated scheduling assignment information or the combined scheduling grant indicator. A transport format decider determines a transport format of an uplink within the maximum rate.

38 Claims, 10 Drawing Sheets

U.S. PATENT DOCUMENTS

2005/0068990 A1* 3/2005 Liu .......................... 370/516
2005/0237932 A1* 10/2005 Liu .......................... 370/230

FOREIGN PATENT DOCUMENTS

| JP | 2004-129085 | 4/2004 |
| JP | 2005-328525 | 11/2005 |
| KR | 10-2004-0064834 A | 7/2004 |
| KR | 10-2004-0099837 A | 12/2004 |
| KR | 10-2005-0106351 A | 11/2005 |
| WO | WO 2005/018114 A1 | 2/2005 |

OTHER PUBLICATIONS

"E-DCH Schedulling with Multiple Node Bs in SHO" Tdoc R1-030425 *3GPP TSG-RAN WG1 #32 Meeting*, Disneyland, Marne la Vallee, France, May 19-23, 2003.

* cited by examiner

METHOD AND APPARATUS FOR SCHEDULING USER EQUIPMENT IN A SOFT HANDOVER REGION FOR UPLINK PACKET TRANSMISSION

PRIORITY

This application claims the benefit under 35 U.S.C. §119 (a) of an application entitled "Method and Apparatus for Scheduling UE in Soft Handover Region for Uplink Packet Transmission" filed in the Korean Intellectual Property Office on Jul. 26, 2004 and assigned Serial No. 2004-58165, and an application entitled "Method and Apparatus for Scheduling UE in Soft Handover Region for Uplink Packet Transmission" filed in the Korean Intellectual Property Office on Aug. 10, 2004 and assigned Serial No. 2004-62973, the contents of both of which are incorporated herein by reference.

BACKGROUND OF THE INVENTION

1. Field of the Invention

The present invention relates generally to asynchronous Wideband Code Division Multiple Access (WCDMA) communication. In particular, the present invention relates to a method and apparatus for efficiently scheduling an enhanced dedicated channel for uplink packet transmission, used by user equipment (UE) located in a soft handover region.

2. Description of the Related Art

A Universal Mobile Telecommunications Service (UMTS) system which is a $3^{rd}$ generation mobile communication system that is based on Global System for Mobile Communications system (GSM) which is a European mobile communication system and uses Wideband Code Division Multiple Access (WCDMA), provides a consistent service capable of transmitting packet-based text, digitized audio or video, and multimedia data at a high rate of 2 Mbps or higher no matter where mobile phone users or computer users are located. UMTS uses the concept of virtual access called "packet-switched access" that uses a packet protocol like Internet Protocol (IP), and can always access any terminal in the network.

FIG. 1 is a diagram illustrating a configuration of a conventional UMTS Terrestrial Radio Access Network (UTRAN) in a UMTS system. Referring to FIG. 1, a UTRAN 12 comprises radio network controllers (RNCs) 16a and 16b, and Node Bs 18a, 18b, 18c and 18d, and connects a terminal or user equipment (UE) 20 to a core network 10. Each of the Node Bs 18a, 18b, 18c and 18d can have a plurality of cells in its lower layer. The RNCs 16a and 16b each control their associated Node Bs in their lower layers. For example, in FIG. 1, the RNC 16a controls the Node Bs 18a and 18b, and the RNC 16b controls the Node Bs 18c and 18d. The Node Bs 18a, 18b, 18c and 18d each control their associated cells. One RNC and its associated Node Bs and cells controlled by the RNC constitute a radio network subsystem (RNS) 14a or 14b.

Each of the RNCs 14a and 14b assigns or manages radio resources of its Node Bs 18a to 18d, and each of the Node Bs 18a to 18d provides the radio resources. The radio resources are generated per cell, and the radio resources provided by the Node Bs 18a to 18d refer to radio resources of cells managed by the Node Bs. The UE 20 can create a radio channel using a radio resource provided by a particular cell of a particular Node B, and perform communication using the created channel. Because distinguishing or differentiating between Node Bs 18a to 18d and their associated cells is meaningless to the UE 20 and the UE 20 recognizes only the physical layers created per cell, the terms "Node Bs 18a to 18d" and "cells" will be used herein as having the same meaning.

An interface between the UE 20 and RNCs 16a and 16b is called a Uu interface, and its detailed hierarchical structure is illustrated in FIG. 2. The Uu interface is divided into a control plane used for control signal exchange between the UE 20 and the RNCs 16a and 16b and a user plane used for data transmission.

Referring to FIG. 2, control-plane (C-plane) signaling 30 is processed through a radio resource control (RRC) layer 34, a radio link control (RLC) layer 40, a media access control (MAC) layer 42, and a physical (PHY) layer 44. A user-plane (U-plane) information 32 is processed through a packet data control protocol (PDCP) layer 36, a broadcast/multicast control (BMC) layer 38, the RLC layer 40, the MAC layer 42 and the PHY layer 44. Among the layers illustrated herein, the PHY layer 44 is located in each cell and the MAC layer 42 through the RRC layer 34 are located in a RNC.

The PHY layer 44 provides an information transfer service using a radio transfer technique, and corresponds to Layer 1 of the Opening Systems Interconnection (OSI) model. Connection between the PHY layer 44 and the MAC layer 42 is achieved by transport channels, and the transport channels are defined according to how specific data is processed in the PHY layer 44.

The MAC layer 42 is connected to the RLC layer 40 through logical channels. The MAC layer 42 delivers data received through a logical channel from the RLC layer 40 to the PHY layer 44 through a proper transport channel, and delivers data received through a transport channel from the PHY layer 44 to the RLC layer 40 through a proper logical channel. In addition, the MAC layer 42 inserts additional information into data received through a logical channel or a transport channel, or analyzes additional information inserted into data and performs an appropriate operation according to the analyzed additional information. Further, the MAC layer 42 controls a random access operation. In the MAC layer 42, a part related to the user plane is called MAC-d, and a part related to the control plane is called MAC-c.

The RLC layer 40 manages setup and release of a logical channel. The RLC layer 40 can operate in one of three operation modes of an acknowledged mode (AM), an unacknowledged mode (UM) and a transparent mode (TM), and each operation mode provides a different function. Generally, the RLC layer 40 has a function of disassembling or assembling a service data unit (SDU) provided from an upper layer in an appropriate size, and an error correction function.

The PDCP layer 36 is located in an upper layer of the RLC layer 40 in the user plane, and has a function of compressing and decompressing a header of data transmitted in the form of an IP packet and a function of losslessly-transmitting data in a situation where a RNC providing a mobile service to a particular UE is changed.

A characteristic of the transport channels connecting the PHY layer 44 to its upper layers is determined by a transport format (TF) that defines physical layer processing processes, such as convolutional channel encoding, interleaving and service-specific rate matching.

Particularly, a UMTS system uses an enhanced uplink dedicated channel (E-DCH) so as to enhance packet transmission performance in uplink communication from a UE to a Node B (or base station (BS)). In order to support stabilized high-speed data transmission, the E-DCH supports such techniques as Hybrid Automatic Retransmission Request (HARQ) and Node B-controlled scheduling. Processing of the E-DCH is achieved by a MAC-e layer located in a lower layer of a MAC-d layer, and in the MAC-e layer, E-DCH data with control information added thereto is called a MAC-enhanced Protocol Data Unit (MAC-e PDU).

FIG. 3 is a diagram illustrating a conventional method of transmitting uplink packet data over an E-DCH in a radio uplink comprising channels 111, 112, 113 and 114. Referring to FIG. 3, reference numeral 100 represents a Node B supporting the E-DCH, and reference numerals 101, 102, 103 and 104 represent UEs transmitting the E-DCH. The Node B 100 analyzes conditions of the UEs 101 through 104 that use the E-DCH, and schedules a data rate of the UEs 101 through 104 according to the analysis result. In order to increase the entire system performance, the scheduling is performed in such a manner that a UE located farther from a Node B is assigned a lower data rate and a UE located nearer to the Node B is assigned a higher data rate as long as a measured Rise-over-Thermal (RoT) value of the Node B does not exceed a target RoT value.

FIG. 4 is a signaling diagram illustrating a conventional procedure for transmitting and receiving messages over an E-DCH. Referring to FIG. 4, in step 202, a Node B and a UE set up an E-DCH therebetween. The E-DCH setup process 202 comprises a process of transmitting messages through a dedicated transport channel. After the E-DCH setup, the UE provides scheduling information to the Node B in step 204. The scheduling information can include UE's transmission power information representing uplink channel information, information on available extra power of the UE, and the amount of transmission data stored in a UE's buffer.

In step 206, the Node B, which receives scheduling information from a plurality of UEs in communication with the Node B, monitors the scheduling information received from the plurality of UEs in order to schedule a data rate of each UE. Specifically, in step 208, the Node B allows the UE to transmit an uplink packet and transmits scheduling assignment information to the UE. The scheduling assignment information comprises a granted maximum data rate and granted transmission timing.

In step 210, the UE determines a transport format (TF) of the E-DCH to be transmitted in a reverse direction, using the scheduling assignment information. The UE transmits uplink (UL) packet data over the E-DCH in step 212, and at the same time, transmits the TF information to the Node B in step 214. In step 216, the Node B determines whether there is an error in the TF information and the packet data. In step 218, the Node B transmits a non-acknowledge (NACK) to the UE over an ACK/NACK channel if there is an error in any of them. However, if there is no error in both of them, the Node B transmits an acknowledge (ACK) to the UE through the ACK/NAKC channel. If the ACK is transmitted, transmission of the corresponding packet data is completed and thus, the UE transmits new data through the E-DCH. However, if the NACK is transmitted, the UE retransmits the same packet data over the E-DCH.

The E-DCH, as it is an enhanced channel for uplink packet transmission, has the basic characteristics of a dedicated channel, and one of the characteristics is to support soft handover. A UE located in a soft handover region can receive downlink information from all of Node Bs included in its active set. Therefore, the UE located in the soft handover region receives scheduling assignment information from all of the Node Bs included in the active set in order to transmit the E-DCH. As a result, because the UE receives different scheduling assignment information from the Node Bs included in the active set, the UE needs to determine whether to transmit the E-DCH according to the different scheduling assignment information.

As described above, in the conventional communication system supporting the E-DCH, a UE located in a soft handover region is scheduled in such a manner that all Node Bs included in the active set transmit scheduling assignment information to the UE, causing an overhead problem in terms of code resources or power transmission resources. In addition, the UE receiving the different scheduling assignment information has difficulty in determining whether to transmit the E-DCH.

SUMMARY OF THE INVENTION

Therefore, to solve the foregoing problem, embodiments of the present invention provide a method and apparatus for scheduling an enhanced uplink dedicated channel (E-DCH) for a user equipment (UE) located in a soft handover region in an asynchronous Wideband Code Division Multiple Access (WCDMA) communication system.

In addition, the present invention provides a method and apparatus in which a UE located in a soft handover region determines a data rate for uplink packet transmission using scheduling information received from Node Bs included in its active set.

According to one aspect of the present invention, there is provided a scheduling method for a user equipment (UE) in soft handover in a mobile communication system supporting an enhanced uplink packet data service. The method comprises the steps of receiving dedicated scheduling assignment information for dedicated scheduling assignment from a serving Node B by a UE that communicates with the serving Node B and at least one non-serving Node B due to soft handover; receiving, by the UE, at least one scheduling grant indicator for common scheduling assignment from the at least one non-serving Node B; determining a combined scheduling grant indicator by combining at least one scheduling grant indicator received from the at least one non-serving Node B; determining whether to use the combined scheduling grant indicator according to a predetermined reference; and determining a maximum rate of an uplink according to the dedicated scheduling assignment information or the combined scheduling grant indicator.

According to another aspect of the present invention, there is provided a scheduling apparatus for a user equipment (UE) in soft handover in a mobile communication system supporting an enhanced uplink packet data service. The apparatus comprises a receiver for receiving dedicated scheduling assignment information for dedicated scheduling assignment from a serving Node B, and receiving at least one scheduling grant indicator for common scheduling assignment from at least one non-serving Node B; a first scheduling decider for determining a combined scheduling grant indicator by combining at least one scheduling grant indicator received from the at least one non-serving Node B; a second scheduling decider for determining whether to use the combined scheduling grant indicator according to a predetermined reference, and a maximum rate of an uplink according to the dedicated scheduling assignment information or the combined scheduling grant indicator; and a transport format decider for determining a transport format of an uplink within the maximum rate.

BRIEF DESCRIPTION OF THE DRAWINGS

The above and other objects, features and advantages of the present invention will become more apparent from the following detailed description when taken in conjunction with the accompanying drawings in which.

Throughout the drawings, the same or similar elements, features and structures are represented by the same reference numerals.

DETAILED DESCRIPTION OF EXEMPLARY EMBODIMENTS

Several exemplary embodiments of the present invention will now be described in detail with reference to the accompanying drawings. In the following description, a detailed description of known functions and configurations incorporated herein has been omitted for conciseness.

Embodiments of the present invention provide an improved scheduling technique for reducing the amount of downlink signaling information generated for scheduling of a user equipment (UE) located in a soft handover region in an enhanced uplink packet data service, definitely determining a transport format (TF) of an enhanced uplink dedicated channel (E-DCH), and efficiently managing uplink resources. In addition, embodiments of the present invention provide a scheduling technique initiated not by a best scheduling Node B (hereinafter referred to as a "serving Node B"), but by the other Node Bs included in an active set (hereinafter referred to as "non-serving Node Bs"). Further, embodiments of the present invention provide a method in which a UE located in a soft handover region receives scheduling assignment information from the serving Node B and scheduling assignment information from the non-serving Node Bs, and analyzing the received scheduling assignment information.

Although embodiments of the present invention will be described herein on the assumption that scheduling authority of a UE is invested per Node B, embodiments of the present invention can also be applied to the case where the scheduling authority of a UE is invested per cell. In this case, it should be construed that an active set of the UE comprises a best scheduling cell and one or more non-best scheduling cells.

A scheduling method for uplink packet transmission can be divided into several methods. The typical scheduling methods comprise a rate scheduling method and a time-and-rate scheduling method. In the rate scheduling method, a Node B controls a data rate of each UE step by step. In the time-and-rate scheduling method, the Node B simultaneously controls a time and a rate for uplink packet transmission of a UE. The two scheduling methods will be described herein below.

Figure 1:
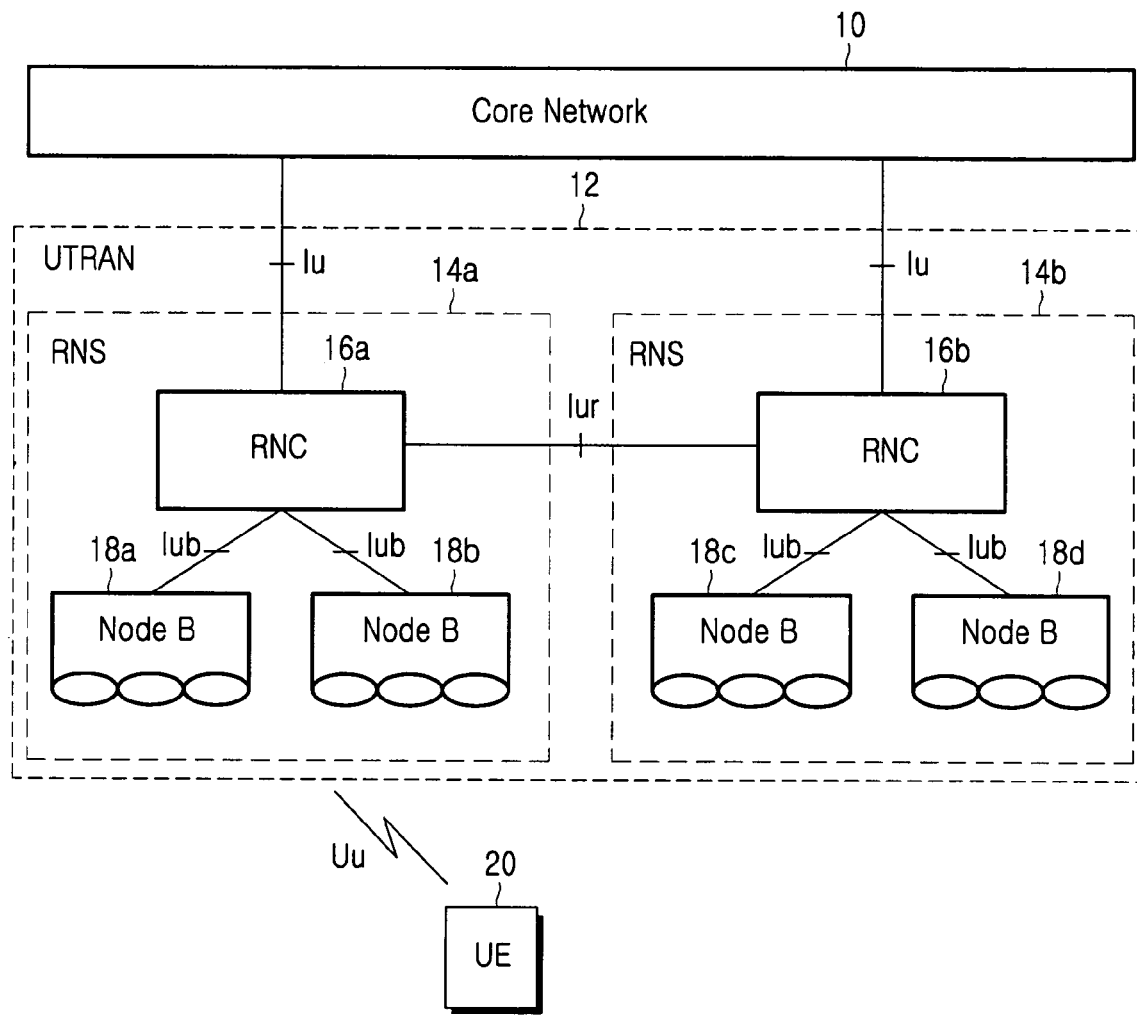
FIG. 1 is a diagram illustrating a conventional configuration of a UMTS Terrestrial Radio Access Network (UTRAN)
Figure 2:
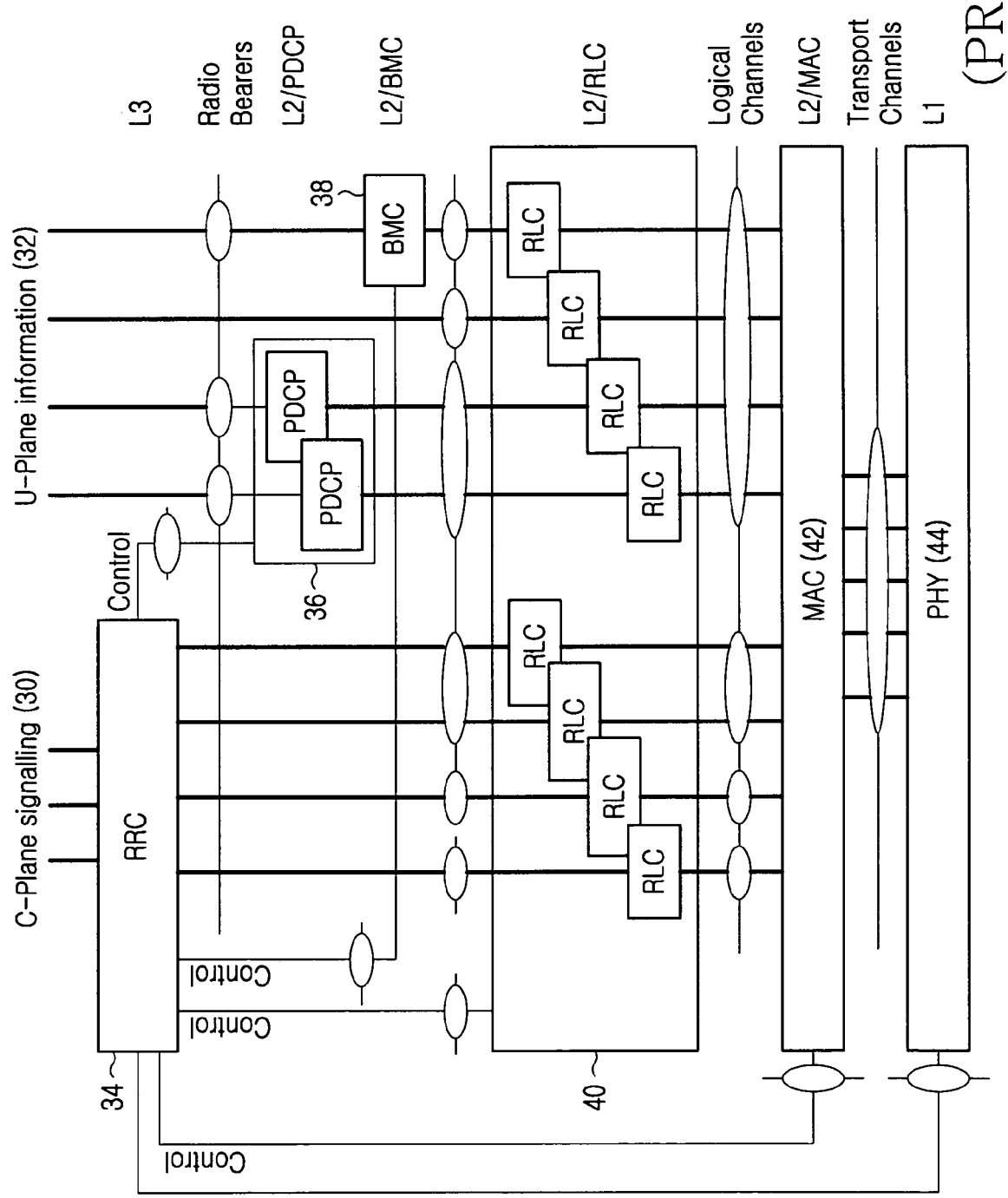
FIG. 2 is a conventional hierarchical structure representing an interface between a user equipment (UE) and a Node B.
Figure 3:
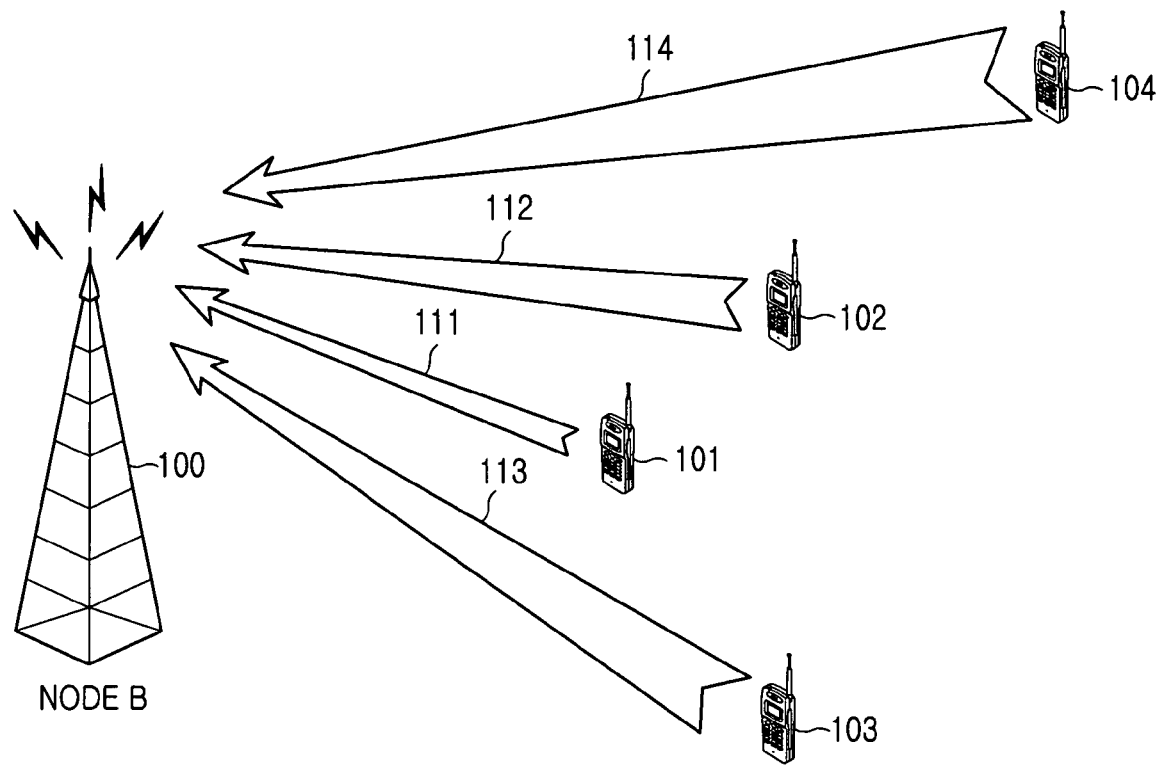
FIG. 3 is a diagram illustrating a conventional method of transmitting uplink packet data over an E-DCH in a conventional radio link.
Figure 4:
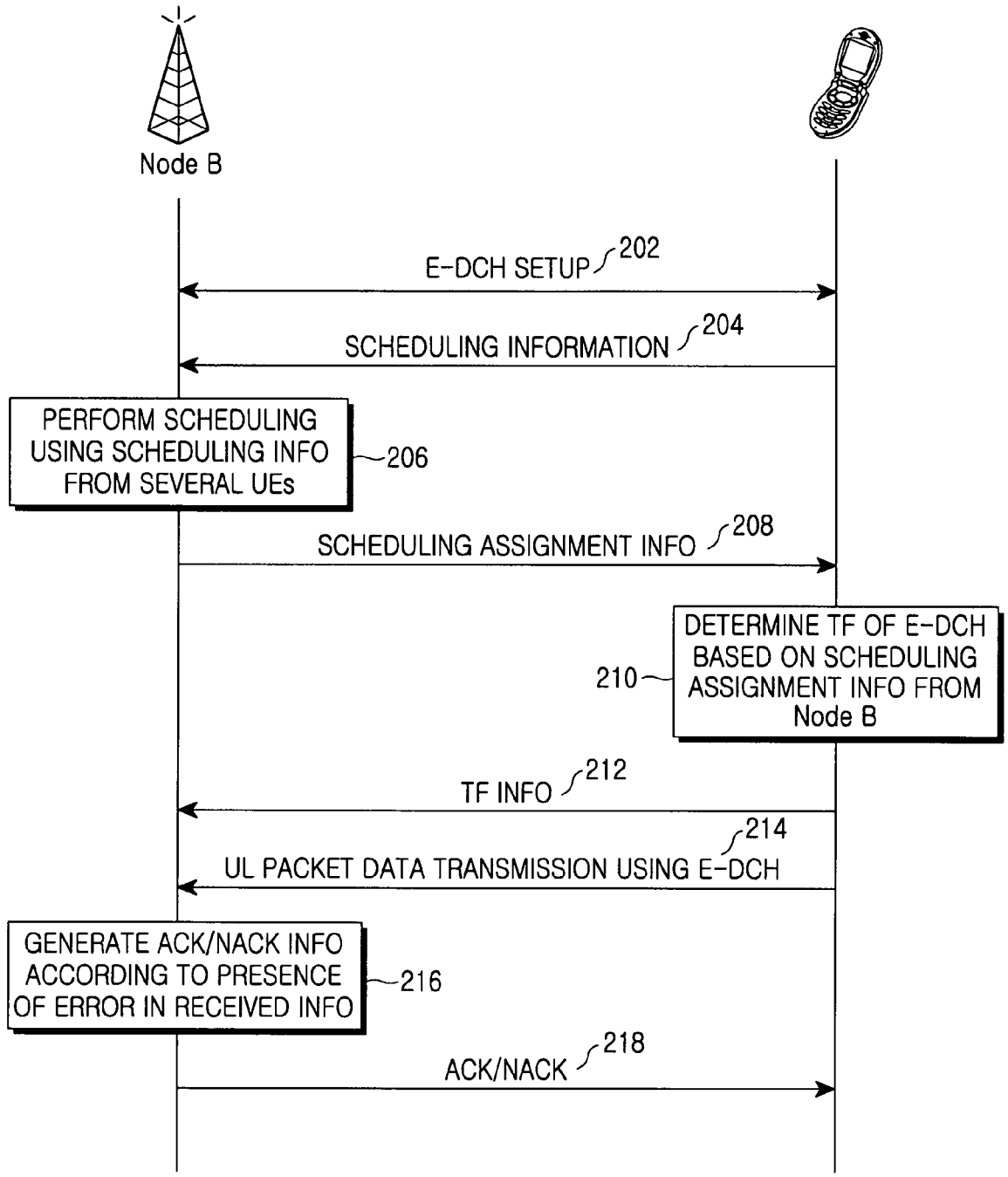
FIG. 4 is a signaling diagram illustrating a conventional procedure for transmitting and receiving messages over an enhanced uplink dedicated channel (E-DCH)
Figure 5:
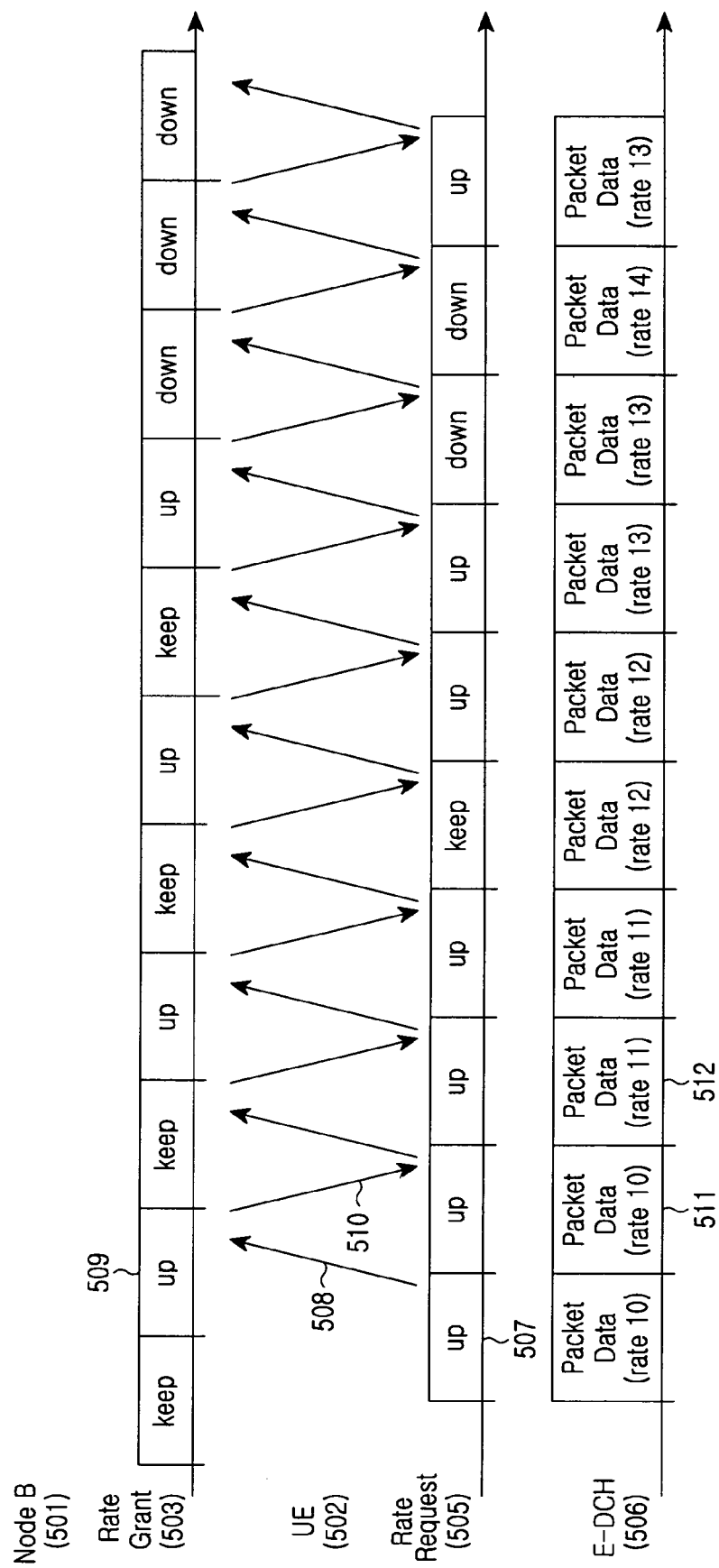
FIG. 5 is a diagram illustrating a rate scheduling method.

FIG. 5 is a diagram illustrating a method for transmitting uplink and downlink control information for rate scheduling, and transmitting an uplink packet.

Referring to FIG. 5, a UE 502 is transmitting rate request information 505 and E-DCH data 506, and a Node B 501 is transmitting rate grant information 503 representing a maximum rate allowed to the UE 502 through scheduling. The rate grant information 503 can represent one of rate-Up, rate-Down, and rate-Keep.

The UE 502 determines the amount of uplink transmission data in its buffer and its available extra power, and transmits a rate-Up/Down request to the Node B 501 through the rate request information 505 according to the determination result in order to set a next desired rate. The Node B 501 receiving the rate request information 505 synthesizes the rate request information transmitted from the UE 502 and other UEs controlled by the Node B 501, determines whether to increase, decrease or keep a maximum rate of the UE 502 according to the synthesis result, and informs the UE 502 of the determination result using the rate grant information 503.

Referring to a specific example of FIG. 5, in step 508, the UE 502 transmits a rate-Up request using rate request information 507 to increase its rate. The Node B 501 receiving the rate request information 507 transmits a rate-Up indicator to the UE 502 using rate grant information 509 after scheduling in step 510. In response, the UE 502 can transmit an uplink packet at a rate 11 (512) which is increased by one step compared with a previous rate 10 (511).

In the foregoing rate scheduling, a Node B and a UE previously have information on the rates available by the UE. For example, the rate information can be expressed with a transport block combination (TBC) representing a transport block size (TBS) used in the WCDMA.

Figure 6:
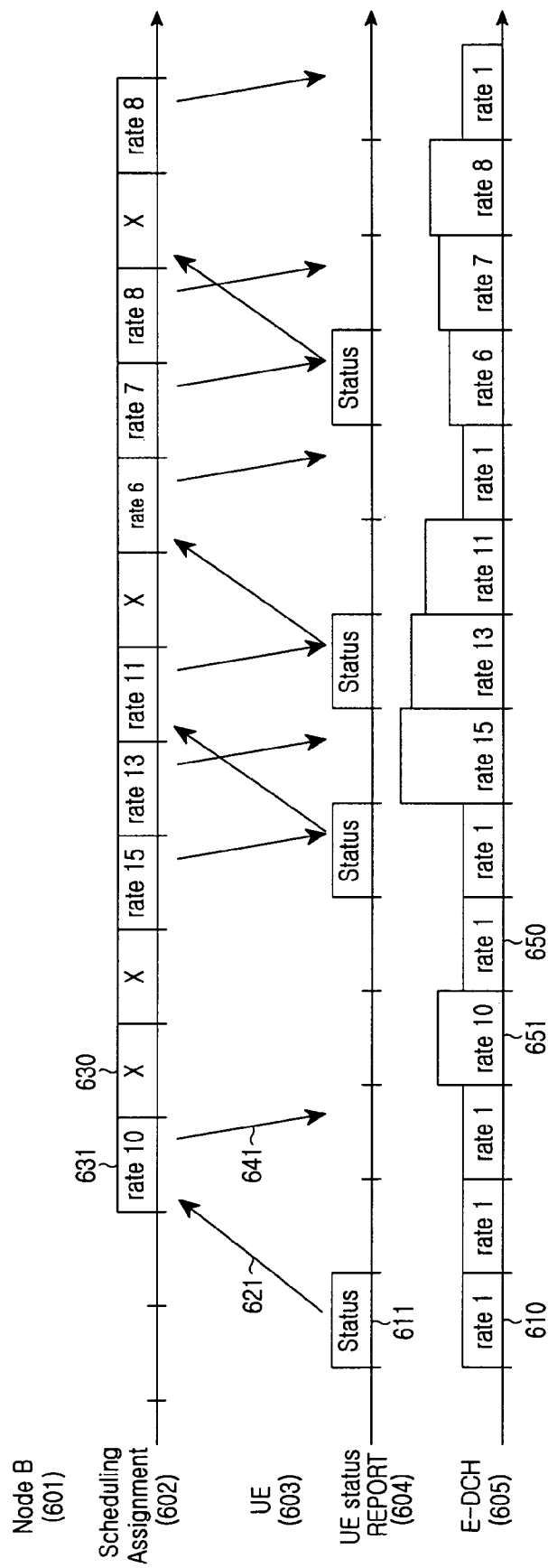
FIG. 6 is a diagram illustrating a time-and-rate scheduling method.

FIG. 6 is a diagram illustrating a method for transmitting uplink and downlink control information for time-and-rate scheduling, and transmitting an uplink packet.

Referring to FIG. 6, a UE 603 transmits UE status information 604 comprising information on the amount of data stored in its buffer and information on transmission power to a Node B 601 periodically or on an event-triggered basis. The Node B 601 determines a maximum rate for the UE 603, to be used for the next duration, through scheduling depending on the UE status information 604, and informs the UE 603 of the determined maximum rate using scheduling assignment (SA) information 602. In response, the UE 603 transmits E-DCH data 605 in the reverse direction for a predetermined time at the maximum rate indicated by the scheduling assignment information 602.

For example, the UE 603 first uses a rate 1 (610) for transmission of E-DCH data 605. In step 621, if the UE 603 transmits UE status information 611 to the Node B 601, the Node B 601 performs scheduling to determine whether to grant E-DCH transmission for the UE 603 for the next duration. If the Node B 601 determines to grant E-DCH transmission, it determines a rate to be granted for the UE 603 and also determines information on a time for which the transmission is granted. In step 641, the Node B 601 transmits the assigned (granted) timing information and the assigned (granted) rate information to the UE 603 using scheduling assignment information 631. The UE 603 receiving the scheduling assignment information 631 transmits E-DCH data according to an assigned rate 10 (651) for a time based on the scheduling assignment information 631. However, if the Node B 601 allocates no time duration to the UE 603 as shown by reference numeral 630, the UE 603 transmits E-DCH data 605 using a rate 1 650 which is the minimum rate.

In the case where both the rate scheduling and the time-and-rate scheduling are used, rate scheduling based on rate grant information is generally used. If there is a need for an abrupt change in rate due to generation or exhaustion of data and an abrupt change in channel conditions, time-and-rate scheduling based on rate grant information can be used.

Figure 7:
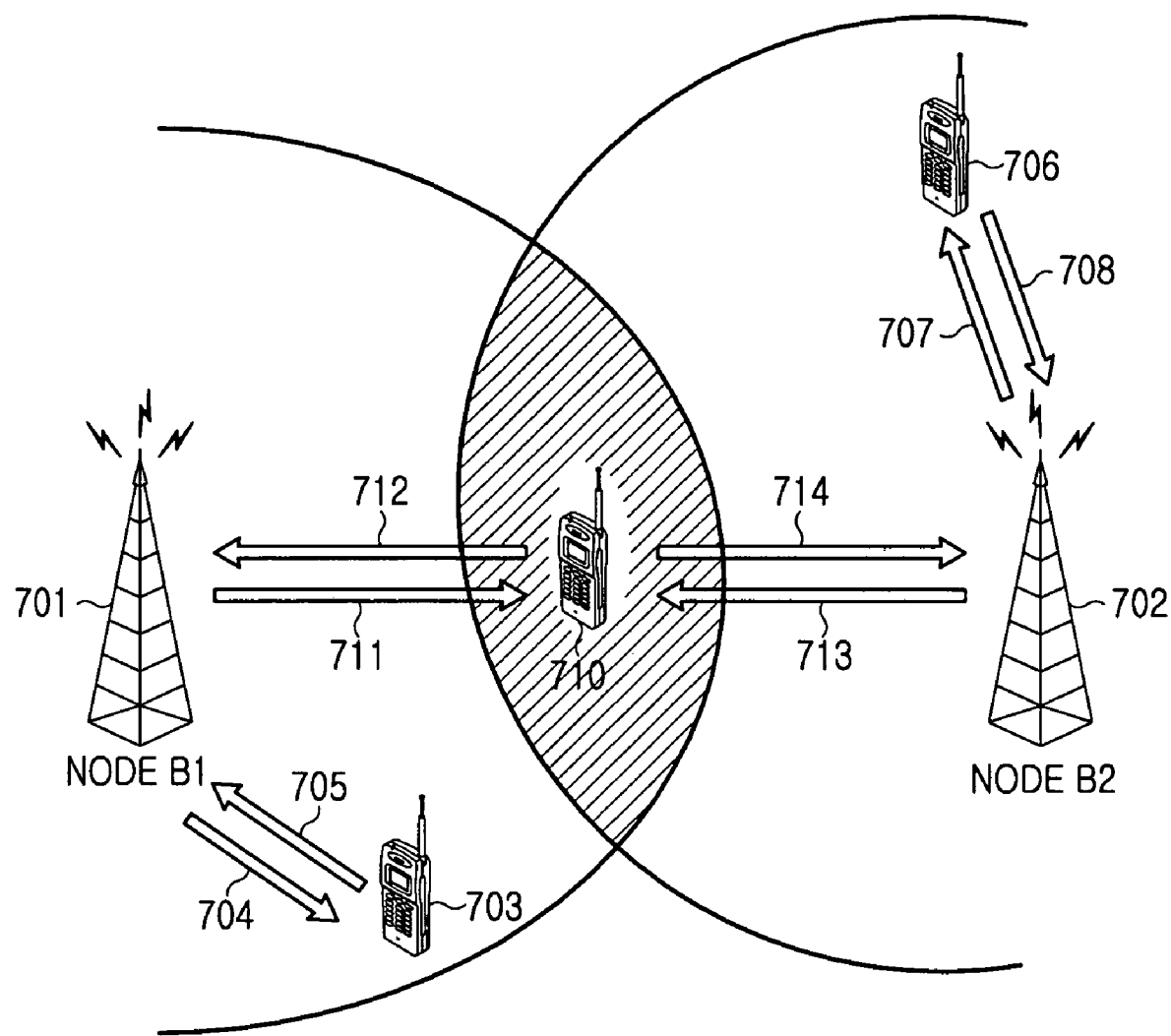
FIG. 7 is a diagram illustrating E-DCH transmission by a UE located in a soft handover region.

FIG. 7 is a diagram illustrating an operation of performing an enhanced uplink packet data service by a UE located in a soft handover region.

In FIG. 7, UEs 703, 706 and 710 can transmit E-DCH data. The UE 710 is located in a soft handover region, and Node Bs 701 and 702 related to the soft handover region are included in an active set of the UE 710. UEs 703 and 706 are not located in the soft handover region, and communicate with only their Node Bs 701 and 702, respectively. The UE 703 receives scheduling assignment information 704 from the Node B1 701 and transmits E-DCH data 705 to the Node B1 701. Similarly, the UE 706 receives scheduling assignment information 707 from the Node B2 702 and transmits E-DCH data 708 to the Node B1 701.

The UE 710 located in the soft handover region has both the Node Bs 701 and 702 in its active set, and receives scheduling assignment information from both the Node Bs 701 and 702. The Node Bs 701 and 702 included in the active set of the UE 710 can perform scheduling on the UE 710 in the same method. More preferably, the Node Bs 701 and 702 can perform scheduling on the UE 710 with different scheduling authorities. In this case, a Node B having the maximum scheduling authority for the UE 710 becomes a serving Node B (or best scheduling Node B) for the UE 710.

For the UE 710, one serving Node B is selected from the Node Bs 701 and 702 included in the active set. For example, a Node B from which the UE 710 is most affected in terms of received noise in the process of transmitting E-DCH data in the reverse direction can be defined as the serving Node B. Generally, one of a Node B located nearest to the UE 710, a Node B having the best uplink or downlink channel condition, and a Node B having surplus uplink resources is defined as a serving Node B.

In FIG. 7, the Node B1 701 is a serving Node B for the UE 710 and the Node B2 702 is a non-serving Node B for the UE 710. The UE 710 receives both of signals 711 and 713 transmitted from the serving Node B 701 and the non-serving Node B 702, and both of the serving Node B 701 and the non-serving Node B 702 also receive signals 712 and 714 transmitted by the UE 710.

If both the serving Node B 701 and the non-serving Node B 702 transmit their own scheduling assignment information to all of the UEs, in active sets of which they are included, through their associated dedicated signaling, consumption of transmission power or code resources inevitably increases due to downlink signaling. In this case, therefore, the Node Bs 701 and 702 lack in transmission power or available channel codes. In particular, if the UE 710 located in the soft handover region communicates with two or more Node Bs 701 and 702 included in its active set, downlink signaling information requires a very high downlink signal strength according to its characteristic. Therefore, the transmission power or code resource consumption problem described above become more significant.

As a method for solving this problem, a scheduling assignment method proposed in an embodiment of the present invention will now be described with reference to FIG. 7.

In FIG. 7, the serving Node B 701 has higher authority that the non-serving Node B 702 in performing scheduling for the UE 710. That is, the serving Node B 701 can perform scheduling on the UE 710 in a more detailed and accurate manner, and the non-serving Node B 702 can perform only rough scheduling on the UE 710 compared with the serving Node B 701. Therefore, the serving Node B 701 performs dedicated scheduling on the UE 710, and the non-serving Node B 702 performs common scheduling with other Node Bs on the UE 710. The common scheduling assignment method can reduce downlink resource consumption and solve the transmission power or code resource lack problem of the non-serving Node B 702.

Figure 8:
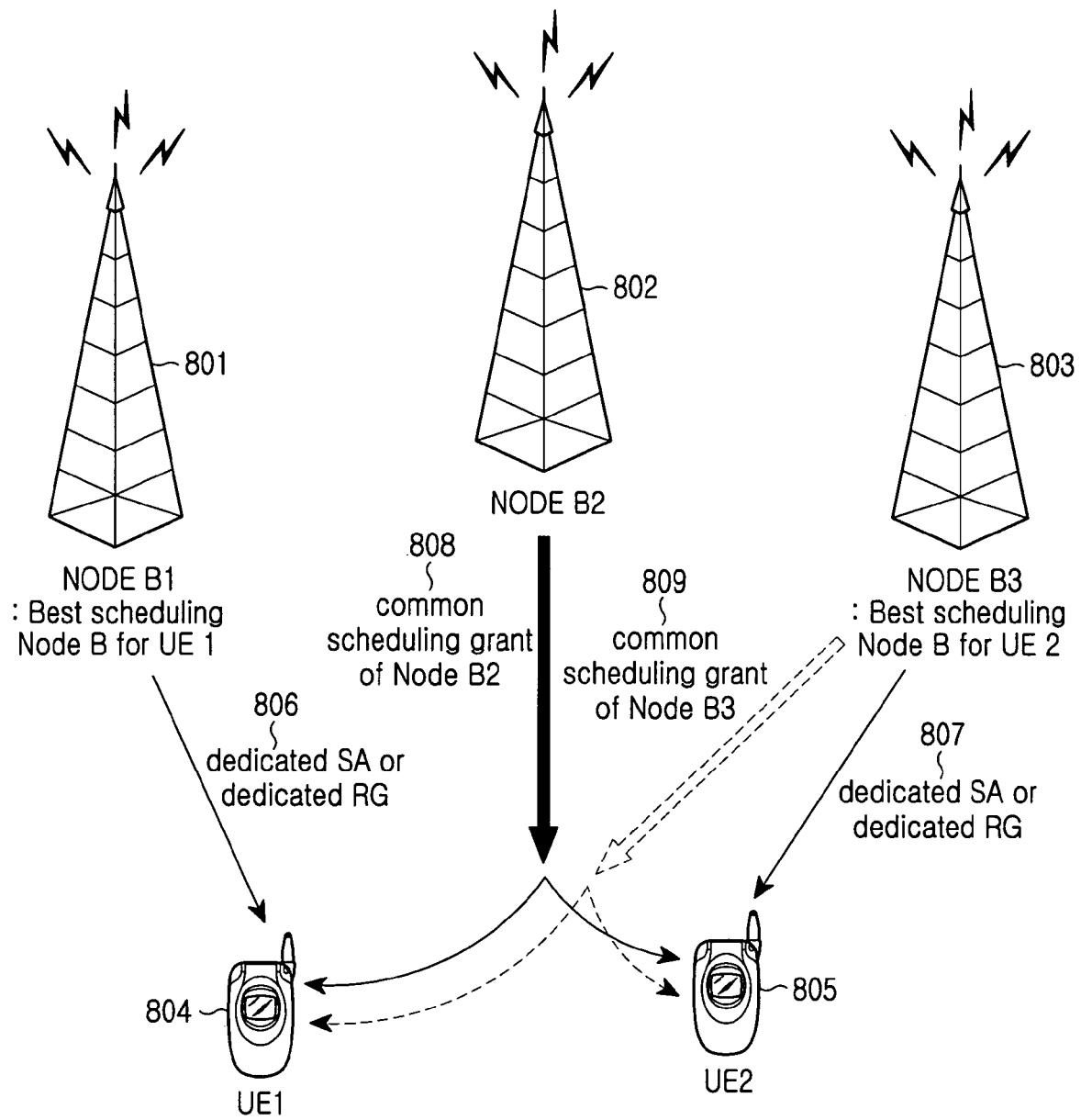
FIG. 8 is a diagram illustrating a common scheduling assignment method of non-serving Node Bs according to an embodiment of the present invention.

FIG. 8 is a diagram illustrating a common scheduling assignment operation of Node Bs according to an embodiment of the present invention.

Referring to FIG. 8, a UE1 804 and a UE2 805 are located in their soft handover regions. The UE1 804 manages an active set comprising a Node B1 801, a Node B2 802 and a Node B3 803, and the Node B1 801 is the serving Node B for the UE1 804. The UE2 805 manages an active set comprising the Node B2 802 and the Node B3 803, and the Node B3 803 is the serving Node B for the UE2 805. In the E-DCH scheduling process, the serving Node Bs schedule their UEs using their own dedicated signaling, and the non-serving Node Bs schedule all of the UEs at a time using the common signaling. In this case, either one or both of the rate scheduling and the time-and-rate scheduling can be used. That is, the Node B1 801 transmits dedicated scheduling assignment information 806 to the UE1 804, and the Node B3 803 also transmits dedicated scheduling assignment information 807 to the UE2 805.

However, because the Node B2 802 is a non-serving Node B for both the UE1 804 and the UE2 805, it performs common scheduling on the UE1 804 and the UE2 805 using single common scheduling assignment information 808. That is, the Node B2 802 transmits the common scheduling assignment information 808 in the forward direction to the UEs 804 and 805, in active sets of which the Node B2 802 is included as a non-serving Node B. The common scheduling assignment information 808 indicates a maximum uplink rate for all of the UEs 804 and 805. The UEs 804 and 805 receive the common scheduling assignment information 808 transmitted from the Node B2 802.

Because the UE1 804 sets the Node B3 803 as a non-serving Node B, it receives common scheduling assignment information 809 transmitted from the Node B3 803. The common scheduling assignment information 809 transmitted from the Node B3 803 is the information that the UE2 805 must receive together with UEs except for the UE1 804, in active sets of which the Node B3 803 is included as a non-serving Node B. The UEs receiving the scheduling assignment information from one or more Node Bs combine the one or more dedicated and common scheduling assignment information, thereby determining a transport format of an E-DCH that each UE can transmit.

As described above, a UE located in a soft handover region receives dedicated scheduling assignment information from a serving Node B, and receives common scheduling assignment information from non-serving Node B(s), and the UE combines the two or more scheduling assignment informations, thereby determining a transport format of an E-DCH. With reference to embodiments of the present invention, a detailed description will now be made of a method in which a UE uses common scheduling assignment information from a non-serving Node B, and a method in which a UE located in a soft handover region analyzes two or more scheduling assignment informations.

First Embodiment

According to a first embodiment of the present invention, a non-serving Node B performs common scheduling using two levels. A serving Node B performs independent dedicated scheduling on each of the UEs, and a non-serving Node B performs common scheduling on several UEs. That is, the serving Node B uses either one or both of the rate scheduling and the time-and-rate scheduling for the dedicated scheduling, and uses the other available scheduling method for another case. However, the non-serving Node B uses a rate scheduling-based 1-bit scheduling grant indicator for the common scheduling. If the 1-bit scheduling grant indicator is used as the common scheduling assignment information, it is possible to avoid a waste of Node B transmission power and channel code resources.

For example, the two levels expressed by the 1-bit scheduling grant indicator represent a Down signal and a Don't Care signal. The 1-bit scheduling grant indicator indicates the Down signal if it has a real value '+1' in a physical channel, and the 1-bit scheduling grant indicator indicates the Don't Care signal if it has a real value '−1' in the physical channel. In the other case, the real values the opposite meanings.

The real values of the scheduling grant indicator can be mapped by considering an occurrence frequency of the Down signal and an occurrence frequency of the Don't Care signal. That is, if a signal, an occurrence frequency of which is expected to be high, is mapped to a real value '0', for which discontinuous transmission (DTX) is used in a physical channel, transmission of the signal reduces power consumed in the physical channel, contributing to a reduction in both transmission power and noise. Herein, the term DTX refers to substantial non-transmission for the corresponding duration. For example, if the Don't Care signal is higher than the Down signal on average in terms of the occurrence frequency, the Don't Care signal is mapped to the real value '0' in the physical channel before being transmitted, and the Down signal is mapped to the real value '+1' (or '−1') in the physical channel before being transmitted. In this case, a receiver distinguishes the two signals using a non-zero reference value.

A description will now be made of a common scheduling assignment method performed by a non-serving Node B.

In the process of performing scheduling, a Node B manages uplink resources by measuring reception strengths of UEs included in coverage of the Node B. The UEs that have set the Node B as a non-serving Node B have very high reception strengths. Therefore, if the UEs having the Node B as a serving Node B or the UEs comprising only the Node B in their active sets are greatly affected, the Node B sets, as a Down signal, the scheduling grant indicator for all of the UEs or the UEs that have set the Node B itself as a non-serving Node B. On the contrary, if the reception strengths do not greatly affect the Node B and the Node B has surplus uplink resources, the Node B sets a scheduling grant indicator for the UEs, as a Don't Care signal.

Figure 9:
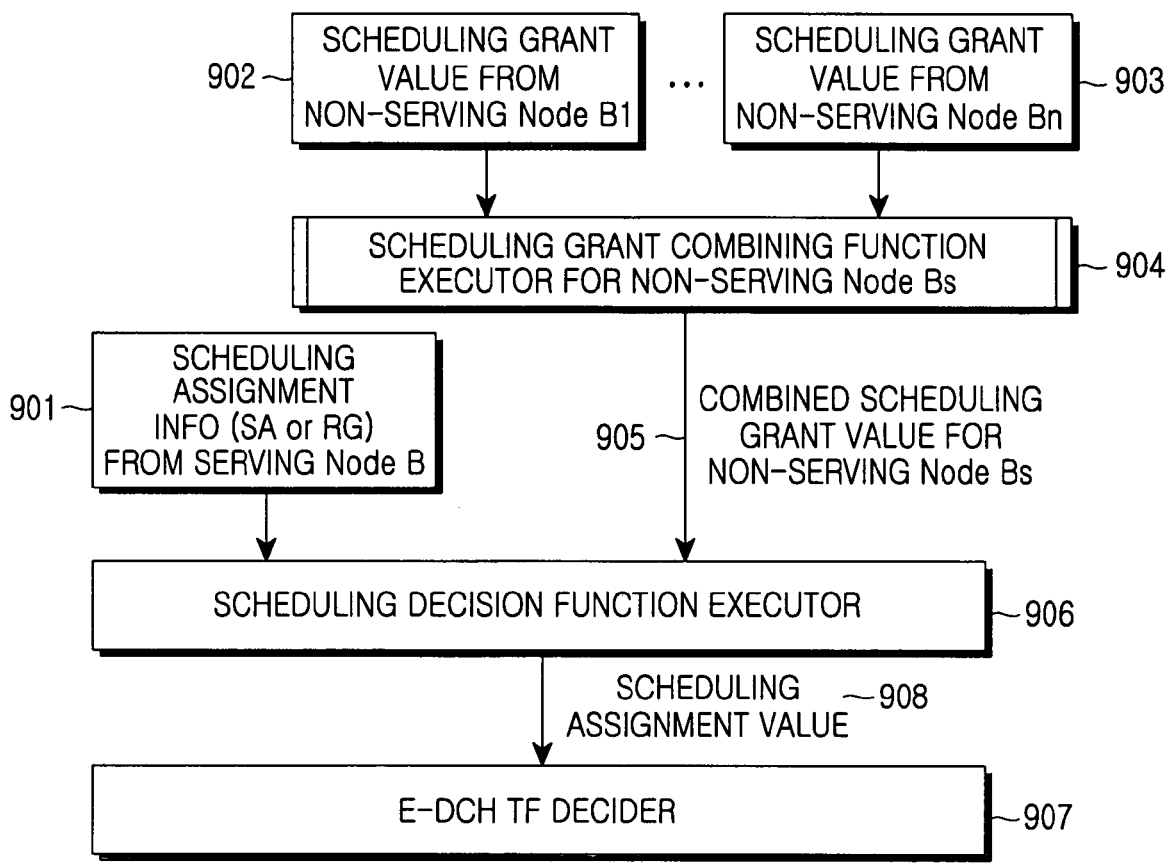
FIG. 9 is a diagram illustrating a structure of a UE receiving scheduling assignment information according to an embodiment of the present invention.

A structure of a UE according to the first embodiment of the present invention is illustrated in FIG. 9. The UE is located in a soft handover region, and has one serving Node B and one or more non-serving Node Bs.

Referring to FIG. 9, a UE receives dedicated scheduling assignment information 901 from a serving Node B. The dedicated scheduling assignment information 901 becomes a rate grant (RG) signal for the rate scheduling method, becomes a scheduling assignment (SA) signal for the time-and-rate scheduling method, and becomes a combination of the rate grant signal and the scheduling assignment signal for the combined method of the two methods. The UE receives n scheduling grant values 902 through 903 from n non-serving Node Bs (where 'n' denotes an integer being greater than or equal to 1). Herein, the scheduling grant value refers to a real value of a scheduling grant indicator. A scheduling grant combining function executor 904 for non-serving Node Bs combines the n scheduling grant values 902 through 903 and determines one combined scheduling grant value 905. An operation of the scheduling grant combining function executor 904 will be described in detailed herein below.

The combined scheduling grant value 905 found from the n scheduling grant values 902 to 903 is input to a scheduling decision function executor 906 along with the dedicated scheduling assignment information 901 received from the serving Node B, and the scheduling decision function executor 906 determines a final scheduling assignment value 908 required by the UE for determining a transport format (TF) of an E-DCH, and an E-DCH TF decider 907 determines an E-DCH TF to be used for uplink transmission using the scheduling assignment value 908 determined by the scheduling decision function executor 906. The E-DCH TF is determined within the maximum rate corresponding to the scheduling assignment value 908. Also, an operation of the scheduling decision function executor 906 will be described in detail herein below.

The scheduling grant combining function executor 904 of FIG. 9 can perform the following operations when the number of non-serving Node Bs is greater than 2.

As one example, if any one of scheduling grant values received by the UE indicates a Down signal, the scheduling grant combining function executor 904 determines the combined scheduling grant value 905 for non-serving Node Bs as a Down signal. That is, the scheduling grant combining function executor 904 determines the combined scheduling grant value 905 for non-serving Node Bs as a Don't Care signal only when all of the scheduling grant values indicate the Don't Care signal. Otherwise, the scheduling grant combining function executor 904 determines the combined scheduling grant value 905 for non-serving Node Bs as a Down signal.

Figure 10:
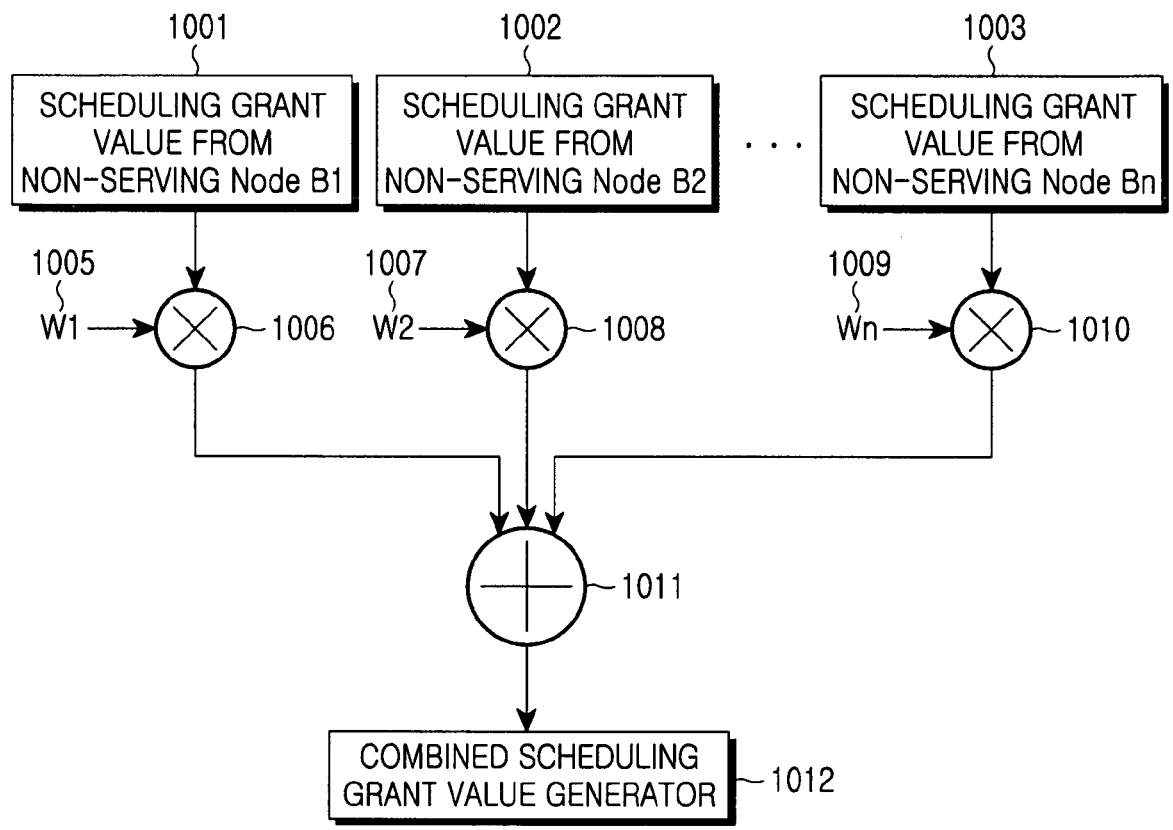
FIG. 10 is a diagram illustrating an exemplary method of determining a combined scheduling grant value according to an embodiment of the present invention.

As another example, the scheduling grant combining function executor 904 combines scheduling grant values from non-serving Node Bs using weight summation. Herein, the weight summation refers to using weight values individually set for the non-serving Node Bs. With reference to FIG. 10, a detailed description will now be made of a structure of the scheduling grant combining function executor 904 for weighted sum combining on the scheduling grant values.

Referring to FIG. 10, if n scheduling grant values 1001, 1002 and 1003 are received from n non-serving Node Bs, the scheduling grant values 1001 through 1003 are multiplied by predetermined weight values 1005, 1007 and 1009 by multipliers 1006, 1008 and 1010, respectively, and then summed by a summer 1011. The weight values separately determined for the non-serving Node Bs are set in such a network as a RNC according to cell geometry, and then provided to a UE. Alternatively, the UE internally sets according to conditions of a channel to a Node B.

Specifically, the scheduling grant value 1001 received from a first non-serving Node B is multiplied in the multiplier 1006 by a weight value W1 (1005) set for the first non-serving Node B, and then input to the summer 1011. The scheduling grant value 1002 received from a second non-serving Node B is multiplied in the multiplier 1008 by a weight value W2 (1007) set for the second non-serving Node B, and then input to the summer 1011. The scheduling grant value 1003 received from an $n^{th}$ non-serving Node B is multiplied in the multiplier 1010 by a weight value Wn (1009) set for the $n^{th}$ non-serving Node B, and then input to the summer 1011. In this manner, the scheduling grant values 1001 through 1003 received from all of the non-serving Node Bs are multiplied by their associated weight values 1005 through 1009, respectively, and then input to the summer 1011.

The summer 1011 generates a summed weight value by summing the scheduling grant values multiplied by the weights 1005 through 1009. A combined scheduling grant value generator 1012 determines a combined scheduling grant value 905 according to the summed weight value. For example, the combined scheduling grant value generator 1012 determines the combined scheduling grant value 905 according to a comparison between the summed weight value and a predetermined reference value. If a scheduling grant indicator with a real value '+1' indicates a Down signal and a scheduling grant indicator with a real value '−1'indicates a Don't Care signal, the reference value becomes '0'. Therefore, if the summed weight value is greater than or equal to '0', the combined scheduling grant value 905 becomes a Down signal, and if the summed weight value is less than '0', the combined scheduling grant value 905 becomes a Don't Care signal. As another example, if the Down signal is a real value '0' and the Don't Care signal is a real value '+1' (or '−1'), the reference value will become '+0.5' (or '−0.5').

The scheduling decision function executor 906 of FIG. 9 receives the determined combined scheduling grant value 905 and the dedicated scheduling assignment information 901 received at a UE from the serving Node B, and outputs a scheduling assignment value 908 such that the UE can determine a TF of an E-DCH to be transmitted. If the combined scheduling grant value 905 indicates Don't Care, even though an E-DCH TF of the UE changes to some extent, non-serving Node Bs of the UE are not greatly affected in using uplink resources. Therefore, the UE determines an E-DCH TF according to the dedicated scheduling assignment information 901 transmitted by the serving Node B.

However, if the combined scheduling grant value 905 indicates Down, it means that E-DCH transmission of the UE serves as a heavy load in using uplink resources by the non-serving Node Bs. The Down refers to a command for decreasing a rate by one step when the rate scheduling is used for E-DCH transmission, and a command for restricting transmission of the E-DCH when the time-and-rate scheduling is used for E-DCH transmission.

If all of the UEs located in a soft handover region decrease a rate of the E-DCH by one step according to the Down signal and determine a TF of the E-DCH at the rate or restrict the E-DCH transmission, individual conditions of the UEs are not taken into consideration, reducing performance and fairness of the system. To solve this problem, the following selective Down methods can be used.

First, in a probabilistic Down decision method, if a probability value generated through a probability test is greater than or equal to a predetermined value, the UE follows a Down decision of the combined scheduling grant value 905. Otherwise, the UE disregards the Down decision of the combined scheduling grant value 905. When the Down decision of the combined scheduling grant value 905 is disregarded, the UE uses the intact format of the previous frame in the process of determining a format of the E-DCH, or follows the dedicated scheduling assignment information 901 from the serving Node B.

A second method determines whether to accept the Down decision according to the current rate of the UE when the rate scheduling is used. The UE has a rate threshold. If the current rate of the E-DCH is higher than or equal to the threshold, a non-serving Node B can be greatly affected by E-DCH transmission of the UE. Therefore, the UE follows a Down decision of the combined scheduling grant value 905. However, if the current rate of the E-DCH is lower than the threshold, the non-serving Node B is not greatly affected by E-DCH transmission of the UE. Therefore, the UE keeps the intact rate of the previous frame instead of following the Down decision of the combined scheduling grant value 905, or follows the dedicated scheduling assignment information 901 from the serving Node B.

A third method determines whether to accept the Down decision according to a service class for the E-DCH of the UE. A UE providing an E-DCH service can be initially allocated a service class, and the class represents the E-DCH service quality of the UE. A criterion for dividing the class can be a selected billing option of the UE user or channel conditions.

For example, a UE with a higher class uses the dedicated scheduling assignment information 901 from the serving Node B no matter whether the Down signal is received or not, and a UE with a lower class decreases an E-DCH rate by one step according to whether a Down signal is received or not. As another example, the UE has a different probability threshold according to the class. If a probability value generated through the probability test is higher than or equal to the probability threshold, the UE follows the Down decision of the combined scheduling grant value 905. Otherwise, the UE disregards the Down decision of the combined scheduling grant value 905. When the Down decision of the combined scheduling grant value 905 is disregarded, the UE uses the intact format of the previous frame in the process of determining a format of the E-DCH, or follows the dedicated scheduling assignment information 901 from the serving Node B.

The class information of each UE can be transmitted to a Node B. The class information can be directly transmitted to the Node B by a network or a UE in the initial channel setup process to the UE. When the Node B has knowledge of a class of the UE, the Node B can select scheduling assignment information by estimating how many UEs among the UEs located in a soft handover region will follow the scheduling assignment information of the Node B.

In a fourth method, a UE receiving the E-DCH service separately receives signaling for a method of analyzing Down signals of the non-serving Node Bs from the RNC. That is, the RNC informs each UE of a method of analyzing Down signals received from non-serving Node Bs during soft handover, i.e., of a scheduling decision function, using RRC signaling, and the UE determines a rate of the E-DCH using the RNC signaling information.

For example, the RNC informs the UE of a scheduling decision function with '1' or '0' according to conditions of the UE. A UE receiving '1' through signaling uses the dedicated scheduling assignment information 901 from the serving Node B no matter whether the Down signal is received or not. However, a UE receiving '0' through signaling decreases an E-DCH rate by one step in response to a Down signal received. As another example, the RNC signals, to each UE, a threshold used for the probability test on the soft handover region. When the non-serving Node B transmits a Down signal, if a probability value generated through the probability test is greater than or equal to the threshold, the UE follows the Down decision of the combined scheduling grant value 905, and otherwise, the UE disregards the Down decision of the combined scheduling grant value 905. When the Down decision of the combined scheduling grant value 905 is disregarded, the UE uses the intact format of the previous frame in the process of determining a format of the E-DCH, or uses the dedicated scheduling assignment information 901 from the serving Node B.

The RNC can more efficiently perform scheduling on the Node B by transmitting the signaling information transmitted to the UE, even to the Node B. That is, the Node B has knowledge of an analysis method for the case where UEs have received a Down signal from a non-serving Node B during soft handover, and selects scheduling assignment information by estimating how many UEs among the UEs located in the soft handover region will follow the scheduling assignment information of the Node B.

The scheduling decision function executor 906 can provide various combinations using the scheduling grant indicators 902 through 903 from the non-serving Node Bs and the dedicated scheduling assignment information 901 from the serving Node B in addition to the foregoing two methods, and outputs a scheduling assignment value 908 according to the combination. The output of the scheduling decision function executor 906 becomes the final scheduling information for the E-DCH to be transmitted by the UE, and the UE determines a TF of the E-DCH using the scheduling information.

Second Embodiment

According to a second embodiment of the present invention, a non-serving Node B performs common scheduling using three signal levels. That is, the non-serving Node B represents three levels of a Down signal, a Marginal Down signal, and a Don't Care signal with a scheduling grant indicator. A serving Node B performs dedicated scheduling on each of UEs through independent dedicated scheduling assignment information, and a non-serving Node B performs common scheduling on several UEs through one scheduling grant indicator. The serving Node B uses either one or both of the rate scheduling and the time-and-rate scheduling for the dedicated scheduling, or uses all the other possible scheduling methods. However, the common scheduling of the non-serving Node B collectively controls the rate in the three levels using the scheduling grant indicator.

The scheduling grant indicator based on the common scheduling indicates a Down signal when it has a real value '+1' in a physical channel, indicates a Don't Care signal when it has a real value '−1' in the physical channel, and indicates a Marginal Down signal when it undergoes DTX, i.e., has a real value '0'. In another case, the three values '+1', '−1' and '0' can be combined with the above signals in a different manner.

For example, the real values are mapped to the scheduling grant indicator taking into account an occurrence frequency for each of the Down signal, the Don't Care signal and the Marginal Down signal. That is, a signal, an occurrence frequency of which is expected to be high, is mapped to a real value '0', for which DTX is used in a physical channel. Herein, the DTX refers to substantial non-transmission for the corresponding duration. Transmission of the signal on a non-transmission basis reduces power consumed in the physical channel, contributing to a reduction in both transmission power and noise. For example, if the Don't Care signal is higher than the Down signal and the Marginal Down signal on average in terms of the occurrence frequency, the UE maps the Don't Care signal to the real value '0' in the physical channel before being transmitted on a non-transmission basis, maps the Down signal to the real value '+1' (or '−1') in the physical channel before being transmitted, and maps the Marginal Down signal to the real value '−1' (or '+1') in the physical channel before being transmitted.

A description will now be made of a common scheduling assignment method performed by a non-serving Node B.

In the process of performing scheduling, a Node B manages uplink resources by measuring reception strengths of UEs included in coverage of the Node B. The UEs that have set the Node B as a non-serving Node B have very high reception strengths. Therefore, if the UEs having the Node B as a serving Node B or the UEs including only the Node B in their active sets are greatly affected, the Node B sets the scheduling grant indicator for the UEs as a Down signal. On the contrary, if the reception strengths do not greatly affect the Node B and the Node B has surplus uplink resources, the Node B sets a scheduling grant indicator for the UEs, as a Don't Care signal. In addition, the reception strengths affect the Node B to some extent but if the non-serving Node B is relatively free in using uplink resources or the Node B has surplus uplink resources by fully restricting uplink transmission of the UEs, the Node B sets the scheduling grant indicator for the UEs as a Marginal Down signal. That is, the Marginal Down signal indicates a less compulsory decrease in an uplink rate as compared with the Down signal.

An operation of the UE according to the second embodiment of the present invention will now be described with reference to FIG. 9. A UE located in a soft handover region has one serving Node B and one or more non-serving Node Bs.

Referring to FIG. 9, a UE receives dedicated scheduling assignment information 901 from a serving Node B. A dedicated scheduling assignment information 901 becomes a rate grant (RG) signal for the rate scheduling method, becomes a scheduling assignment (SA) signal for the time-and-rate scheduling method, and becomes a combination of the rate grant signal and the scheduling assignment signal for the combined method of the two methods. The UE receives n scheduling grant values 902 through 903 from n non-serving Node Bs (where 'n' denotes an integer being greater than or equal to 1). Herein, the scheduling grant value refers to a real value of a scheduling grant indicator. The scheduling grant combining function executor 904 for non-serving Node Bs combines the n scheduling grant values 902 through 903 and determines one combined scheduling grant value 905. An operation of the scheduling grant combining function executor 904 will be described in detailed herein below.

The combined scheduling grant value 905 found from the n scheduling grant values 902 to 903 is input to a scheduling decision function executor 906 along with the dedicated scheduling assignment information 901 received from the serving Node B, and the scheduling decision function executor 906 determines a final scheduling assignment value 908 required by the UE for determining a transport format (TF) of an E-DCH, and an E-DCH TF decider 907 determines an E-DCH TF to be used for uplink transmission using the scheduling assignment value 908 determined by the scheduling decision function executor 906. The E-DCH TF is determined within the maximum rate corresponding to the scheduling assignment value 908. Also, an operation of the scheduling decision function executor 906 will be described in detail herein below.

The scheduling grant combining function executor 904 of FIG. 9 can perform the following operations when the number of non-serving Node Bs is greater than 2.

As one example, the scheduling grant combining function executor 904 uses a reference setting method of using a Down signal as a preferential reference. That is, if any one of scheduling grant values 902 through 903 received by the UE indicates a Down signal, the scheduling grant combining function executor 904 determines the combined scheduling grant value 905 for non-serving Node Bs as a Down signal. If none of the scheduling grant values is the Down signal, the scheduling grant combining function executor 904 uses a Marginal Down signal as the next reference. That is, if none of the scheduling grant values 902 through 903 received by the UE is the Down signal but if any one of them indicates a Marginal Down signal, the scheduling grant combining function executor 904 determines the combined scheduling grant value 905 as a Marginal Down signal. Finally, if all of the scheduling grant values received by the UE are Don't Care signals, the scheduling grant combining function executor 904 determines the combined scheduling grant value 905 for the non-serving Node Bs as a Don't Care signal.

As another example, the UE combines combined scheduling grant values for the non-serving Node Bs using weight summation. Herein, the weight summation refers to using weight values individually set for the non-serving Node Bs. With reference to FIG. 10, a detailed description will now be made of a weighted sum combining method for the scheduling grant weighted sums according to the second embodiment of the present invention.

Referring to FIG. 10, if n scheduling grant values 1001, 1002 and 1003 are received from n non-serving Node Bs, the scheduling grant values 1001 through 1003 are multiplied by predetermined weight values 1005, 1007 and 1009 by multipliers 1006, 1008 and 1010, respectively, and then summed by a summer 1011. The summer 1011 generates a summed weight value by summing the scheduling grant values multiplied by the weights 1005 through 1009. A combined scheduling grant value generator 1012 determines a combined scheduling grant value 905 according to the summed weight value.

The combined scheduling grant value 905 is determined by comparing the summed weight value with 2 predetermined reference values. For example, if a scheduling grant indicator with a real value '+1' indicates a Down signal, a scheduling grant indicator with a real value '0' indicates a Marginal Down signal, and a scheduling grant indicator with a real value '−1' indicates a Don't Care signal, the reference values compared with the summed weight value become one value (first value) between '+1' and '0' and another value (second value) between '0' and '−1'. Therefore, if the summed weight value is greater than the first value, the combined scheduling grant value 905 is determined as a Down signal, and if the summed weight value is less than the second value, the combined scheduling grant value 905 is determined as a Don't Care signal. If the summed weight value ranges between the first value and the second value, the combined scheduling grant value 905 is determined as a Marginal Down signal. The first value and the second value can be ones of predetermined values, values provided from an RNC through signaling, and values selected by the UE.

As another example, the scheduling grant combining function executor 904 operates in a combined method of the above two examples. Specifically, the scheduling grant combining function executor 904 preferentially determines the combined scheduling grant value 905 as a Down signal if there is any Down signal among the scheduling grant values 902 through 903, and determines the combined scheduling grant value 905 using a weight summation method for a Marginal Down signal and a Don't Care signal if there is no Down signal. Herein, a reference value between '0' and '−1' is used to distinguish the Marginal Down signal from the Don't Care signal.

The scheduling decision function executor 906 of FIG. 9 receives the determined combined scheduling grant value 905 and the dedicated scheduling assignment information 901 received at a UE from the serving Node B, and outputs a scheduling assignment value 908 such that the UE can determine a TF of an E-DCH to be transmitted. If the combined scheduling grant value 905 indicates Don't Care, even though an E-DCH TF of the UE changes to some extent, non-serving Node Bs of the UE are not greatly affected in using uplink resources. Therefore, the UE determines an E-DCH TF according to the dedicated scheduling assignment information 901 transmitted by the serving Node B.

However, if the combined scheduling grant value 905 indicates Down, it means that E-DCH transmission of the UE serves as a heavy load in using uplink resources by the non-serving Node Bs. Therefore, the UE unconditionally decreases an allowed maximum rate of the E-DCH by one step according to the Down signal, and determines a TF of the E-DCH at the rate.

Finally, if the combined scheduling grant value 905 indicates Marginal Down, it means that E-DCH transmission of the UE can be a relatively heavy load in using uplink resources by the non-serving Node Bs. That is, the combined scheduling grant value 905 indicating Marginal Down indicates that the non-serving Node Bs have transmitted a command for decreasing the rate by one step (for the rate scheduling) or a command for restricting E-DCH transmission (for the time-and-rate scheduling) to all of UEs or to UEs that have set them as non-serving Node Bs. Therefore, like the Down signal in the first embodiment, the Marginal Down signal uses the following selective down methods.

First, in a probabilistic Down decision method, if a probability value generated through a probability test is greater than or equal to a predetermined value, the UE decreases a rate of the E-DCH by one step, analyzing a Marginal Down decision of the combined scheduling grant value 905 as a Down decision. Otherwise, the UE disregards the combined scheduling grant value 905. When the combined scheduling grant value 905 is disregarded, the UE uses the intact format of the previous frame in the process of determining a format of the E-DCH, or follows the dedicated scheduling assignment information 901 from the serving Node B.

A second method determines whether to accept the Marginal Down decision according to the current rate of the UE when the rate scheduling is used. The UE has a predetermined rate threshold. If the current rate of the E-DCH is higher than or equal to the threshold, a non-serving Node B can be greatly affected by E-DCH transmission of the UE. Therefore, the UE decreases a rate of the E-DCH by one step, analyzing the Marginal Down decision of the combined scheduling grant value 905 as a Down decision. However, if the current rate of the E-DCH is lower than the threshold, the non-serving Node B is not greatly affected by E-DCH transmission of the UE. Therefore, the UE keeps the intact rate of the previous frame, disregarding the combined scheduling grant value 905, or follows the dedicated scheduling assignment information 901 from the serving Node B.

In a third method, a UE receiving an E-DCH service uses an initially allocated class. The class can be a class for the quality of the E-DCH of the UE, and a method for determining a rate of the E-DCH can be performed according to the class. A criterion for dividing the class can be a selected billing option of the UE user or channel conditions. The UE has a predetermined class, and operates in the following manner according to the class upon receiving a Marginal Down signal.

A UE with a higher class uses the dedicated scheduling assignment information 901 from the serving Node B no matter whether the Marginal Down signal is received or not, but a UE with a lower class decreases an E-DCH rate by one step upon receiving the Marginal Down signal, determining the received Marginal Down signal as a Down signal. As another example, the UE has a different probability threshold according to the class. If a probability value generated through the probability test is higher than or equal to the probability threshold, the UE analyzes the Marginal Down signal as a Down signal of the combined scheduling grant value 905. Otherwise, the UE disregards the combined scheduling grant value 905. When the combined scheduling grant value 905 is disregarded, the UE uses the intact format of the previous frame in the process of determining a format of the E-DCH, or follows the dedicated scheduling assignment information 901 from the serving Node B.

The class information of each UE can be transmitted to a Node B. The class information can be directly transmitted to the Node B by a network or a UE in the initial channel setup process to the UE. When the Node B has knowledge of a class of the UE, the Node B can select scheduling assignment information by estimating how many UEs among the UEs located in a soft handover region will follow the scheduling assignment information of the Node B.

In a fourth method, a UE receiving the E-DCH service separately receives signaling for a method of analyzing Marginal Down signals of the non-serving Node Bs from the RNC. That is, the RNC informs each UE of a method of analyzing Marginal Down signals received from non-serving Node Bs during soft handover, i.e., of a scheduling decision function, using RRC signaling, and the UE determines a rate of the E-DCH using the signaling information from the RNC.

For example, the RNC informs the UE of a scheduling decision function with '1' or '0' according to conditions of the UE. A UE receiving '1' through signaling uses the intact dedicated scheduling assignment information 901 from the serving Node B, regarding the Marginal Down signal as a Don't Care signal. However, a UE receiving '0' through signaling decreases an E-DCH rate by one step, regarding the Marginal Down signal as a Down signal. As another example, the RNC signals, to each UE, a threshold used for the probability test on the soft handover region. When the non-serving Node B transmits a Marginal Down signal, if a probability value generated through the probability test is greater than or equal to the threshold signaled by the RNC, the UE determines the Marginal Down signal of the combined scheduling grant value 905 as a Down signal, and otherwise, the UE disregards the combined scheduling grant value 905. When the combined scheduling grant value 905 is disregarded, the UE uses the intact format of the previous frame in the process of determining a format of the E-DCH, or uses the intact dedicated scheduling assignment information 901 from the serving Node B.

The RNC can more efficiently perform scheduling on the Node B by transmitting the signaling information transmitted to the UE, even to the Node B. That is, the Node B has knowledge of an analysis method for the case where UEs have received a Marginal Down signal from a non-serving Node B during soft handover, and selects scheduling assignment information by estimating how many UEs among the UEs located in the soft handover region will follow the scheduling assignment information of the Node B.

The scheduling decision function executor 906 can provide various combinations using the scheduling grant indicators 902 through 903 from the non-serving Node Bs and the dedicated scheduling assignment information 901 from the serving Node B in addition to the foregoing two methods, and outputs a scheduling assignment value 908 according to the combination. The output of the scheduling decision function executor 906 becomes the final scheduling information for the E-DCH to be transmitted by the UE, and the UE determines a TF of the E-DCH using the scheduling information.

A description has been made of the method in which a Node B schedules UEs located in a soft handover region through a scheduling grant indicator in two embodiments and each UE determines a TF of the E-DCH using scheduling grant indicators received from non-serving Node Bs and dedicated scheduling assignment information received from a serving Node B. The first embodiment expresses the scheduling grant indicator in two levels of a Down signal and a Don't Care signal, and the second embodiment expresses the scheduling grant indicator in three levels of a Down signal, a Marginal Down signal, and a Don't Care signal.

As can be understood from the foregoing description, the present invention can reduce a waste of Node B transmission power and downlink channel code resources through transmission of downlink scheduling information signals for scheduling of UEs located in a soft handover region, and enable an individual UE to perform a different function using common scheduling information by presenting an additional analysis method for a UE.

While the invention has been shown and described with reference to certain exemplary embodiments thereof, it will be understood by those skilled in the art that various changes in form and details may be made therein without departing from the spirit and scope of the invention as defined by the appended claims. For example, in an alternative embodiment of the present invention, the scheduling grant indicator is expressed in an increased number of levels, enabling a non-serving Node B to flexibly perform common scheduling.

What is claimed is:

1. A scheduling method for a user equipment (UE) during soft handover in a mobile communication system supporting an enhanced uplink packet data service, the method comprising the steps of: receiving dedicated scheduling assignment information for dedicated scheduling assignment from a serving Node B by a UE that communicates with the serving Node B and at least one non-serving Node B due to soft handover; receiving, by the UE, at least one scheduling grant indicator for common scheduling assignment from the at least one non-serving Node B; determining a combined scheduling grant indicator by combining at least one scheduling grant indicator received from the at least one non-serving Node B; determining whether to use the combined scheduling grant indicator according to a predetermined reference; determining a maximum rate of an uplink according to the dedicated scheduling assignment information or the combined scheduling grant indicator; wherein each of the at least one scheduling grant indicator indicates whether the scheduling grant indicator is care signal by the UE or not, and wherein the at least one scheduling grant indicator represents a Down signal for indicating a command to decrease a maximum rate for the enhanced unlink packet data service by one step. or represents a Don't Care signal for indicating a command to follow the dedicated scheduling assignment information.

2. The scheduling method of claim 1, wherein the step of determining a combined scheduling grant indicator comprises the steps of:
    determining the combined scheduling grant indicator as a Down signal, if the at least one scheduling grant indicator comprises at least one Down signal; and
    determining the combined scheduling grant indicator as a Don't Care signal, if all of the at least one scheduling grant indicator is the Don't Care signal.

3. The scheduling method of claim 1, wherein the step of determining a combined scheduling grant indicate or comprises the steps of:

calculating a summed weight value by applying a weight assigned to a corresponding non-serving Node B to the at least one scheduling grant indicator; and comparing the summed weight value with a predetermined reference value and determining the combined scheduling grant indicator as a Down signal or a Don't Care signal according to the comparison result.

4. The scheduling method of claim 1, wherein the step of determining a maximum rate comprises the steps of;

determining the maximum rate according to the dedicated scheduling assignment information if the combined scheduling grant indicator is a Don't Care signal; and determining the maximum rate according to at least one of a predetermined probability value, a current uplink rate of the UB, a service class of the UE, and a control signaling signal of a network, if the combined scheduling grant indicator is a Down signal.

5. The scheduling method of claim 4, further comprising the steps of:

comparing a generated probability value with a predetermined threshold if the combined scheduling grant indicator is a Down signal;

decreasing the maximum rate by one step if the probability value is greater than or equal to the threshold; and determining the maximum rate according to the dedicated scheduling assignment information or keeping a rate of a previous frame if the probability value is less than the threshold.

6. The scheduling method of claim 4, further comprising the steps of:

comparing a current uplink rate of the UE with a predetermined threshold if the combined scheduling grant indicator is a Down signal;

decreasing the maximum rate by one step if the current uplink rate is greater than or equal to the threshold; and determining the maximum rate according to the dedicated scheduling assignment information or keeping a rate of a previous frame if the current uplink rate is less than the threshold.

7. The scheduling method of claim 4, further comprising the steps of:

determining the maximum rate according to the dedicated scheduling assignment information if a service class set for the UE is a higher class; and decreasing the maximum rate by one step if the service class is a lower class.

8. The scheduling method of claim 4, further comprising the steps of:

determining the maximum rate according to the dedicated scheduling assignment information if a signaling signal from a network is a predetermined bit value; and decreasing the maximum rate by one step if the signaling signal is not the predetermined bit value.

9. The scheduling method of claim 1, wherein the at least one scheduling grant indicator represents a Down signal for indicating a command to decrease a maximum rate for the enhanced uplink packet data service by one step, represents a Don't Care signal indicating a command to follow the dedicated scheduling assignment information, or represents a Marginal Down signal indicating a command to decrease the allowed maximum rate.

10. The scheduling method of claim 9, wherein the step of determining a combined scheduling grant indicator comprises the steps of:

determining the combined scheduling grant indicator as a Down signal, if the at least one scheduling grant indicator comprises at least one Down signal;

determining the combined scheduling grant indicator as a Marginal Down signal if the at least one scheduling grant indicator comprises no Down signal and comprises at least one Marginal Down signal; and determining the combined scheduling grant indicator as a Don't Care signal, if all of the at least one scheduling grant indicator is the Don't Care signal.

11. The scheduling method of claim 9, wherein the step of determining a combined scheduling grant indicator comprises the steps of:

calculating a summed weight value by applying a weight assigned to a corresponding non-serving Node B to the at least one scheduling grant indicator; and comparing the summed weight value with a predetermined reference value and determining the combined scheduling grant indicator as a Down signal, a Marginal Down signal or a Don't Care signal according to the comparison result.

12. The scheduling method of claim 9, wherein the step of determining a maximum rate comprises the steps of;

determining the maximum rate according to the dedicated scheduling assignment information if the combined scheduling grant indicator is a Don't Care signal;

decreasing the maximum rate by one step if the combined scheduling grant indicator is a Down signal; and determining a transport format according to at least one of a predetermined probability value, a current uplink rate of the UF, a service class of the UE, and a control signaling signal of a network, if the combined scheduling grant indicator is a Marginal Down signal.

13. The scheduling method of claim 12, further comprising the steps of:

comparing a generated probability value with a predetermined threshold if the combined scheduling grant indicator is a Marginal Down signal;

decreasing the maximum rate by one step if the probability value is greater than or equal to the threshold; and determining the maximum rate according to the dedicated scheduling assignment information or keeping a rate of a previous frame if the probability value is less than the threshold.

14. The scheduling method of claim 12, further comprising the steps of:

comparing a current uplink rate of the UE with a predetermined threshold if the combined scheduling grant indicator is a Marginal Down signal;

decreasing the maximum rate by one step if the current uplink rate is greater than or equal to the threshold; and determining the maximum rate according to the dedicated scheduling assignment information or keeping a rate of a previous frame if the current uplink rate is less than the threshold.

15. The scheduling method of claim 12, further comprising the steps of:

determining the maximum rate according to the dedicated scheduling assignment information if a service class set for the UE is a higher class; and decreasing the maximum rate by one step if the service class is a lower class.

16. The scheduling method of claim 12, further comprising the steps of:

determining the maximum rate according to the dedicated scheduling assignment information if a signaling signal from a network is a predetermined bit value; and decreasing the maximum rate by one step if the signaling signal is not the predetermined bit value.

17. The scheduling method of claim 1, wherein the dedicated scheduling grant information represents any one of a Down signal for indicating a command to decrease a maximum rate for the enhanced uplink packet data service by one step, a Keep signal for indicating a command to keep the maximum rate, and an Up signal for indicating a command to increase the maximum rate by one step.

18. The scheduling method of claim 1, wherein the dedicated scheduling assignment information comprises a scheduling assignment signal directly indicating a maximum rate and transmission timing for the enhanced uplink packet data service.

19. The scheduling method of claim 1, wherein the dedicated scheduling assignment information comprises any one of:
   a rate grant signal comprising any one of a Down signal for indicating a command to decrease a maximum rate for the enhanced uplink packet data service by one step, a Keep signal for indicating a command to keep the maximum rate, and an Up signal for indicating a command to increase the maximum rate by one step; and
   a scheduling assignment signal for directly indicating the maximum rate.

20. A scheduling apparatus for a user equipment (UE) during soft handover in a mobile communication system supporting an enhanced uplink packet data service, the apparatus comprising: a receiver for receiving dedicated scheduling assignment information for dedicated scheduling assignment from a serving Node B, and receiving at least one scheduling grant indicator for common scheduling assignment from at least one non-serving Node B, a first scheduling decider for determining a combined scheduling grant indicator by combining at least one scheduling grant indicator received from the at least one non-serving Node B; a second scheduling decider for determining whether to use the combined scheduling grant indicator according to a predetermined reference, and a maximum rate of an uplink according to the dedicated scheduling assignment information or the combined scheduling grant indicator; a transport format decider for determining a transport format of an uplink within the maximum rate; wherein each of the at least one scheduling grant indicator indicates whether the scheduling grant indicator is care signal by the UE or not, and wherein the at least one scheduling grant indicator represents a Down signal for indicating a command to decrease a maximum rate for the enhanced uplink packet data service by one step, or represents a Don't Care signal for indicating a command to follow the dedicated scheduling assignment information.

21. The scheduling apparatus of claim 20, wherein the first scheduling decider comprises:
   determining the combined scheduling grant indicator as a Down signal, if the at least one scheduling grant indicator comprises at least one Down signal; and
   determining the combined scheduling grant indicator as a Don't Care signal, if all of the at least one scheduling grant indicator is the Don't Care signal.

22. The scheduling apparatus of claim 20, wherein the first scheduling decider comprises:
   calculating a summed weight value by applying a weight assigned to a corresponding non-serving Node B to the at least one scheduling grant indicator; and
   comparing the summed weight value with a predetermined reference value and determining the combined scheduling grant indicator as a Down signal or a Don't Care signal according to the comparison result.

23. The scheduling apparatus of claim 20, wherein the second scheduling decider comprises:
   determining the maximum rate according to the dedicated scheduling assignment information if the combined scheduling grant indicator is a Don't Care signal; and
   determining the maximum rate according to at least one of a predetermined probability value, a current uplink rate of the UE, a service class of the UE, and a control signaling signal of a network, if the combined scheduling grant indicator is a Down signal.

24. The scheduling apparatus of claim 23, wherein the second scheduling decider further comprises:
   comparing a generated probability value with a predetermined threshold if the combined scheduling grant indicator is a Down signal;
   decreasing the maximum rate by one step if the probability value is greater than or equal to the threshold; and
   determining the maximum rate according to the dedicated scheduling assignment information or keeping a rate of a previous frame if the probability value is less than the threshold.

25. The scheduling apparatus of claim 23, wherein the second scheduling decider further comprises:
   comparing a current uplink rate of the UE with a predetermined threshold if the combined scheduling grant indicator is a Down signal;
   decreasing the maximum rate by one step if the current uplink rate is greater than or equal to the threshold; and
   determining the maximum rate according to the dedicated scheduling assignment information or keeping a rate of a previous frame if the current uplink rate is less than the threshold.

26. The scheduling apparatus of claim 23, wherein the second scheduling decider further comprises:
   determining the maximum rate according to the dedicated scheduling assignment information if a service class set for the UF is a higher class; and
   decreasing the maximum rate by one step if the service class is a lower class.

27. The scheduling apparatus of claim 23, wherein the second scheduling decider further comprises:
   determining the maximum rate according to the dedicated scheduling assignment information if a signaling signal from a network is a predetermined bit value; and
   decreasing the maximum rate by one step if the signaling signal is not the predetermined bit value.

28. The scheduling apparatus of claim 20, wherein the at least one scheduling grant indicator represents a Down signal for indicating a command to decrease a maximum rate for the enhanced uplink packet data service by one step, represents a Don't Care signal for indicating a command to follow the dedicated scheduling assignment information, or represents a Marginal Down signal for indicating a command to decrease the allowed maximum rate.

29. The scheduling apparatus of claim 28, wherein the first scheduling decider comprises:
   determining the combined scheduling grant indicator as a Down signal, if the at least one scheduling grant indicator comprises at least one Down signal;
   determining the combined scheduling grant indicator as a Marginal Down signal if the at least one scheduling grant indicator comprises no Down signal and comprises at least one Marginal Down signal; and
   determining the combined scheduling grant indicator as a Don't Care signal, if all of the at least one scheduling grant indicator is the Don't Care signal.

30. The scheduling apparatus of claim 28, wherein the first scheduling decider comprises:

calculating a summed weight value by applying a weight assigned to a corresponding non-serving Node B to the at least one scheduling grant indicator; and comparing the summed weight value with a predetermined reference value and determining the combined scheduling grant indicator as a Down signal, a Marginal Down signal or a Don't Case signal according to the comparison result.

31. The scheduling apparatus of claim 28, wherein the second scheduling decider comprises;

determining the maximum rate according to the dedicated scheduling assignment information if the combined scheduling grant indicator is a Don't Care signal;

decreasing the maximum rate by one step if the combined scheduling grant indicator is a Down signal; and determining a transport format according to at least one of a predetermined probability value, a current uplink rate of the UE, a service class of the UE, and a control signaling signal of a network, if the combined scheduling grant indicator is a Marginal Down signal.

32. The scheduling apparatus of claim 31, wherein the second scheduling decider further comprises:

comparing a generated probability value with a predetermined threshold if the combined scheduling grant indicator is a Marginal Down signal;

decreasing the maximum rate by one step if the probability value is greater than or equal to the threshold; and determining the maximum rate according to the dedicated scheduling assignment information or keeping a rate of a previous frame if the probability value is less than the threshold.

33. The scheduling apparatus of claim 31, wherein the second scheduling decider further comprises:

comparing a current uplink rate of the UE with a predetermined threshold if the combined scheduling grant indicator is a Marginal Down signal;

decreasing the maximum rate by one step if the current uplink rate is greater than or equal to the threshold; and determining the maximum rate according to the dedicated scheduling assignment information or keeping a rate of a previous frame if the current uplink rate is less than the threshold.

34. The scheduling apparatus of claim 31, wherein the second scheduling decider further comprises:

determining the maximum rate according to the dedicated scheduling assignment information if a service class set for the UE is a higher class; and decreasing the maximum rate by one step if the service class is a lower class.

35. The scheduling apparatus of claim 31, wherein the second scheduling decider further comprises:

determining the maximum rate according to the dedicated scheduling assignment information if a signaling signal from a network is a predetermined bit value; and decreasing the maximum rate by one step if the signaling signal is not the predetermined bit value.

36. The scheduling apparatus of claim 20, wherein the dedicated scheduling grant information represents any one of a Down signal for indicating a command to decrease a maximum rate for the enhanced uplink packet data service by one step, a Keep signal for indicating a command to keep the maximum rate, and an Up signal for indicating a command to increase the maximum rate by one step.

37. The scheduling apparatus of claim 20, wherein the dedicated scheduling assignment information comprises a scheduling assignment signal directly indicating a maximum rate and transmission timing for the enhanced uplink packet data service.

38. The scheduling apparatus of claim 20, wherein the dedicated scheduling assignment information comprises any one of:

a rate grant signal comprising any one of a Down signal for indicating a command to decrease a maximum rate for the enhanced uplink packet data service by one step, a Keep signal for indicating a command to keep the maximum rate, and an Up signal for indicating a command to increase the maximum rate by one step; and a scheduling assignment signal directly indicating the maximum rate.

* * * * *